US 8,548,225 B2

(12) United States Patent
Jin et al.

(10) Patent No.: US 8,548,225 B2
(45) Date of Patent: Oct. 1, 2013

(54) POINT SELECTION IN BUNDLE ADJUSTMENT

(75) Inventors: Hailin Jin, San Jose, CA (US); Kai Ni, Atlanta, GA (US)

(73) Assignee: Adobe Systems Incorporated, San Jose, CA (US)

( * ) Notice: Subject to any disclaimer, the term of this patent is extended or adjusted under 35 U.S.C. 154(b) by 1127 days.

(21) Appl. No.: 12/323,113

(22) Filed: Nov. 25, 2008

(65) Prior Publication Data

US 2013/0121558 A1 May 16, 2013

Related U.S. Application Data

(60) Provisional application No. 61/089,372, filed on Aug. 15, 2008.

(51) Int. Cl.
*G06K 9/00* (2006.01)
(52) U.S. Cl.
USPC .......................................................... 382/154
(58) Field of Classification Search
None
See application file for complete search history.

(56) References Cited

U.S. PATENT DOCUMENTS

| 2006/0008121 | A1* | 1/2006 | Zhang et al. | 382/107 |
| 2007/0253618 | A1* | 11/2007 | Kim et al. | 382/154 |
| 2007/0297695 | A1* | 12/2007 | Aratani et al. | 382/284 |
| 2008/0228434 | A1* | 9/2008 | Aratani et al. | 702/150 |
| 2008/0273751 | A1* | 11/2008 | Yuan et al. | 382/103 |

OTHER PUBLICATIONS

Snavely, et al., "Skeletal Graphs for Efficient Structure from Motion," 11 pages, Apr. 4, 2008.
Steedly, et al., "Spectral Partitioning for Structure from Motion," 8 pages, Apr. 3, 2008.
Ni, et al., "Out-of-Core Bundle Adjustment for Large-Scale 3D Reconstrcution," IEEE, 8 pages, 2007.

* cited by examiner

*Primary Examiner* — Amir Alavi
*Assistant Examiner* — Kenny Cese
(74) *Attorney, Agent, or Firm* — Wolfe-SBMC

(57) ABSTRACT

In an embodiment, a method comprises receiving a set of three dimensional (3D) points estimated from a plurality of images; selecting a subset of the 3D points that, as a group, provide at least a desired amount of constraint on each of a plurality of camera parameters; and performing non-linear optimization over the selected subset of 3D points to recover the plurality of camera parameters and the 3D points. The selected subset excludes one or more 3D points in the set.

22 Claims, 3 Drawing Sheets

POINT SELECTION IN BUNDLE ADJUSTMENT

RELATED APPLICATION

This application claims benefit of priority to U.S. Provisional Patent Application Ser. No. 61/089,372, filed on Aug. 15, 2008. The Provisional Patent Application is incorporated herein by reference. To the extent that anything in the Provisional Patent Application contradicts material expressly included herein, the material herein controls.

FIELD OF THE INVENTION

This invention is related to the field of video processing and, more particularly, to structure from motion mechanisms in video processing.

BACKGROUND

DESCRIPTION OF THE RELATED ART

Structure from motion mechanisms typically include one or more initial estimation steps to estimate three dimensional (3D) points of a 3D space captured by a video and also to estimate various camera parameters of the camera used to capture the video (e.g. locations of the camera as it passes through the 3D space, orientation of the camera, rotation, etc.). After one or more passes of estimating the points and camera parameters, a bundle adjustment step is typically performed. The bundle adjustment step attempts to refine the estimations of the 3D points and camera parameters, generally using non-linear optimization techniques over all the estimated points and the estimated camera parameters.

Typically, all the 3D points that have been estimated are included in the bundle adjustment step. However, as the number of points increase, the processing time for the bundle adjustment step increases dramatically. Each additional 3D point adds three variables to the non-linear optimization (the x, y, and z location of the point in the 3D space). Furthermore, computation time in non-linear optimization generally increases at greater than linear rates as the number of variables being optimized increases. Additionally, points are often not evenly distributed, which can over constrain some of the parameters to be optimized while not constraining other parameters enough. Solving for the optimization can take longer, or even fail, in such situations.

SUMMARY

In an embodiment, a method comprises receiving a set of three dimensional (3D) points estimated from a plurality of images; selecting a subset of the 3D points that, as a group, provide at least a desired amount of constraint on each of a plurality of camera parameters; and performing non-linear optimization over the selected subset of 3D points to recover the plurality of camera parameters and the 3D points. The selected subset excludes one or more 3D points in the set. A computer accessible storage medium storing instructions which, when executed, implement the method and a corresponding computer system are also contemplated.

Figure 1:
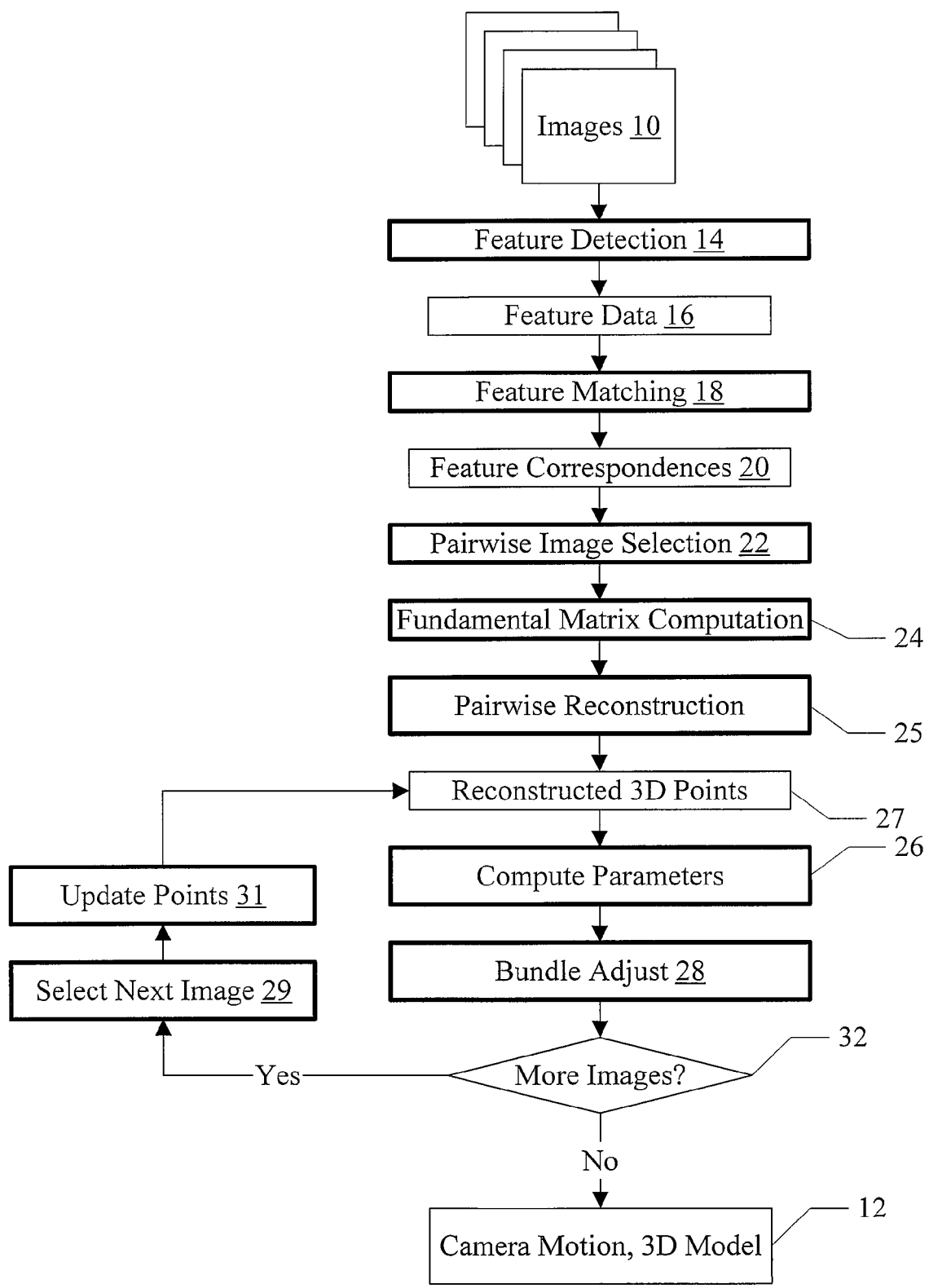
FIG. 1 illustrates an exemplary structure from motion system according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these terms or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, other information storage devices, transmission devices, or display devices of the special purpose computer or similar special purpose electronic computing device.

Various embodiments of a method and apparatus for determining structure from motion are described. For example, the system may receive a set of images captured by a camera. From the images, the system may determine various camera motion parameters and various parameters for a 3D model of the objects in the images. The camera motion parameters may include, for example, camera rotations, focal lengths, 3D orientation, 3D translation (movement in 3D space), etc. The 3D model parameters may include the location, within a 3D space, of the various points from the images.

In one embodiment, a bundle adjustment module is included in the structure from motion system. In the bundle adjustment module, the camera motion parameters and 3D model parameters are optimized together to refine the estimates of all parameters. In some cases, the number 3D points may be large, which may increase the computational effort (and thus time) consumed by the bundle adjustment module. For example, various non-linear optimization techniques may be used. Computational effort may increase at greater than linear rates when non-linear optimizers are used. For example, in one embodiment, the Levenberg-Marquardt algorithm may be used. A direct implementation of the Levenberg-Marquardt algorithm may scale quadratically with the number of points while a sparse implementation may scale super-linearly with respect to the number of points. Additionally, in some cases, 3D points may be clustered in certain areas, or at least may exhibit a lack of even distribution in the 3D space and/or in the images. When uneven distribution is significant, the distribution may cause some of the unknowns to be more constrained then others, which may lead to ill-conditioned results from the optimization.

In one embodiment, the bundle adjustment module may include selecting points over which to optimize the unknowns, to alleviate uneven distribution of points and reduce computational effort. Specifically, the bundle adjustment module may include determining indications of contributions of each 3D point to each camera motion parameter. An overall contribution may be calculated for each point based on its contribution to each parameter. One or more points having the highest overall contribution may be selected, and the overall contributions of the remaining points may be updated. The selection process may be repeated until enough points are selected and each parameter is considered to be sufficiently constrained. The nonlinear optimization may then be performed using only the selected points.

In one embodiment, updating the overall contributions of the remaining points may include eliminating the contributions for each 3D point to a parameter that is considered to be sufficiently conditioned. Thus, if points are unevenly distributed in a fashion that a parameter would be over constrained if all points are used, the remaining points that make a large contribution to that parameter may have their updated overall contributions reduced. Other 3D points may thus be selected, avoiding at least some of the points that over constrain the parameter in some cases. Additionally, fewer points may be used, which may reduce the computational effort of the bundle adjustment.

FIG. 1 illustrates an exemplary structure from motion system that may employ the point selection in the bundle adjustment mechanism described herein, in one embodiment. In FIG. 1, heavy line boxes indicate code segments or modules that implement portions of the structure from motion system, in one embodiment. Lighter line boxes illustrate data or data structures. In some embodiments, one or more of the modules and/or the system as a whole may be implemented in hardware and/or a combination of code and hardware. Each code segment or code module comprises a plurality of instructions which, when executed in a computer system or systems, may implement the operation described for the module.

A set of images 10 may be provided to the system, which may produce camera motion parameters, a 3D model of objects in the image, etc. (reference numeral 12). The images may be provided to the feature detection module 14, which may detect various features in the images. The detected features are described for each image in the feature data 16 as shown in FIG. 1. In general, features may comprise any identifiable structures in the image. For example, features may comprise one or more of points, lines, curves, surfaces, etc., in various embodiments. The feature matching module 18 may compare the feature data 16 for various pairs of images, and may generate feature correspondences 20 between the pairs of images. The feature correspondences may identify the images for which the correspondence is detected, as well as the location of the matched feature in each image. The feature correspondences 20 may further include other information regarding the features (e.g. color, data describing the gradient in the image near the features, etc.).

Any feature detection mechanism may be used in various embodiments. In some embodiments, the initial set of feature correspondences may be augmented by forming regions in the images and attempting to match regions between images. For example, at least a pair of the images 10 may be segmented using various image segmentation algorithms. The system may count potential feature correspondences between regions in the two images. The system may employ Progress Sample Consensus (PROSAC) to find a projective transformation between the best matching region pairs. Topological information may be used to match remaining regions. In this manner, additional feature correspondences may be identified that may be missed in standard feature detection/feature matching mechanisms.

Once the feature correspondences have been detected, the system may attempt to identify the camera parameters and corresponding 3D model parameters for the images. In general, the camera parameters and 3D model parameters may be determined by optimizing the parameters together to minimize the reprojection errors of the matched features into the images. In one implementation, the compute parameters module 26 may attempt to find camera parameters and 3D model parameters based on the reconstructed 3D points mentioned above. The result may be optimized to minimize reprojection error in the bundle adjustment module 28.

The pairwise image selection module 22 may select a pair of images to initialize the reconstruction of camera parameters and 3D model parameters. The pair may include an image of interest from the images 10. The image of interest may be identified in any fashion. For example, user input may identify the image of interest. In another example, the image of interest may be automatically selected. The pairwise image selection module 22 may further select an additional image that has feature correspondences with the image of interest and has sufficient parallax with respect to the image of interest. For example, the image having the most feature correspondences with the image of interest may be selected. In yet other embodiments, the pair having the most feature correspondences may be selected, and one of the pair may be arbitrarily identified as the image of interest.

Based on the feature correspondences between the pair of images identified by the pairwise image selection module 22, the fundamental matrix computation module 24 may calculate the fundamental matrix for the image pair. The fundamental matrix may generally be a matrix that describes how corresponding points in one image are related to the other image, although there are uncertainties in the overall relationship since the camera motion parameters are not accurately known. Fundamental matrix calculation module 24 may calculate the fundamental matrix in any known fashion.

The fundamental matrix from the fundamental matrix computation module 24 and the feature correspondences 20 may be provided to the pairwise reconstruction module 25. The pairwise reconstruction module 25 may use this data to estimate the locations of the points from the matched features in 3D space ("reconstructed 3D points"). The estimates may be formed from the relative positions of the matching features within the respective images and the fundamental matrix. The pairwise reconstruction module 25 may initialize the reconstructed 3D points data structure 27 with the reconstructed 3D points from the initial image pair.

Generally, the compute parameters module 26 may attempt to recover the camera parameters corresponding to each additional image and the 3D points that are added by each additional image that is added to the images that have been processed. In the initial iteration, the reconstructed 3D points provided by the pairwise reconstruction module 25 may be used to recover the initial camera parameters and 3D points. Subsequently, the points added from the newly selected image (by the select next image module 29) may be recovered as well as additional camera parameters corresponding to the newly selected image.

The compute parameters module 26 may use the reconstructed 3D points to compute the camera motion parameters and 3D model parameters. Specifically, in one embodiment, the compute parameters module 26 may group the 3D reconstructed points into natural groups. For example, the points corresponding to a given image of interest may be grouped based on which other images the points are detected in. A given point may be detected in more that one other image, and may be included in the groups for each other image in which they are detected. The compute parameters module 26 may score the groups based on the likelihood that the feature correspondences are inliers. The compute parameters module 26 may initially provide points for sampling by a consensus estimator such as RANSAC and/or its variants from the highest scoring group or groups, and may gradually permit sampling of points from lower scoring groups as the estimator iterates. Randomness may generally be maintained, but the sampling has been biased toward the groups viewed as most likely to include inliers (that is, from the groups with the highest scores). Thus, the consensus estimator may rapidly converge on a solution, in some embodiments. The verification of the proposed model generated by an iteration of the consensus estimator may still be performed over the full set of reconstructed 3D points 27 (i.e. including those points that are not in the groups from which sampling is performed). Other embodiments may not include the grouping, as desired.

Upon completion of the compute parameters module 26, the system may perform bundle adjustment on the result to refine the camera parameters and 3D model by minimizing the reprojection error in the bundle adjustment module 28. In some embodiments, the bundle adjustment algorithm may include identifying a subset of points based on the contributions of the points to the various camera motion parameters and performing a non-linear algorithm to optimize the parameters. For example, the Levenberg-Marquardt algorithm may be used in one embodiment, although any algorithm may be used in other embodiments. Generally, non-linear algorithms require computational effort that increases non-linearly with respect to the number of points input to the algorithm. For example, a direct implementation of the Levenberg-Marquardt algorithm may scale quadratically with the number of points while a sparse implementation may scale super-linearly with respect to the number of points. It is possible to use all points in some embodiments, and all points may be used in some embodiments. In other embodiments, the bundle adjustment module may attempt to quantify the contribution of each point to each parameter being determined by the system (e.g. camera motion parameters and 3D model parameters). Points with the highest contribution may be selected and the contribution of the remaining points may be updated. Once enough points have been selected to constrain the desired parameters at a given threshold of accuracy, the non-linear algorithm maybe executed over the selected points. Optionally, additional points may be selected to further improve the accuracy of the solution.

The compute parameters module 26 and the bundle adjustment module 28 may thus complete the first iteration of camera motion parameter estimation and 3D model parameter estimation based on the initial image pair. Additional iterations may the be performed based on additional images in the set of images 10. If there are still more images to process (decision block 32, "yes" leg), a select next image module 29 may select another image. For example, the image having the next highest number of feature correspondences with the image of interest (or with another image that has already been processed) may be selected. The update points module 31 may update the reconstructed 3D points with additional points derived from the selected image, and the modules 26 and 28 may be iterated again. Each iteration may further refine the parameter estimates. If there are no more images to process (decision block 32, "no" leg), the structure from motion system may store the camera motion parameters and 3D model parameters (reference numeral 12).

While FIG. 1 illustrates that the bundle adjustment module 28 executes on each iteration (for each image), some embodiments may only execute the bundle adjustment module 28 every "N" iterations of the loop (e.g. after every N new images have been processed). "N" may generally be a positive integer (e.g. 5, 10, etc.).

The modules 22, 24, 26, and 28 may be iterated for other images of interest to determine additional camera motion and 3D model parameters for the result 12. Alternatively, the system may operate in parallel on different images of interest (e.g. on different computer systems in a distributed computing platform). Still further, the system may operate in parallel based on different images of interest, and the results from the parallel operations may be merged at some point. For example, user input may determine when the parallel operations are to be merged, or the system may select the merge point automatically. The merge point may be selected at any time after at least one common image has been processed in the parallel operations, in various embodiments.

Figure 2:
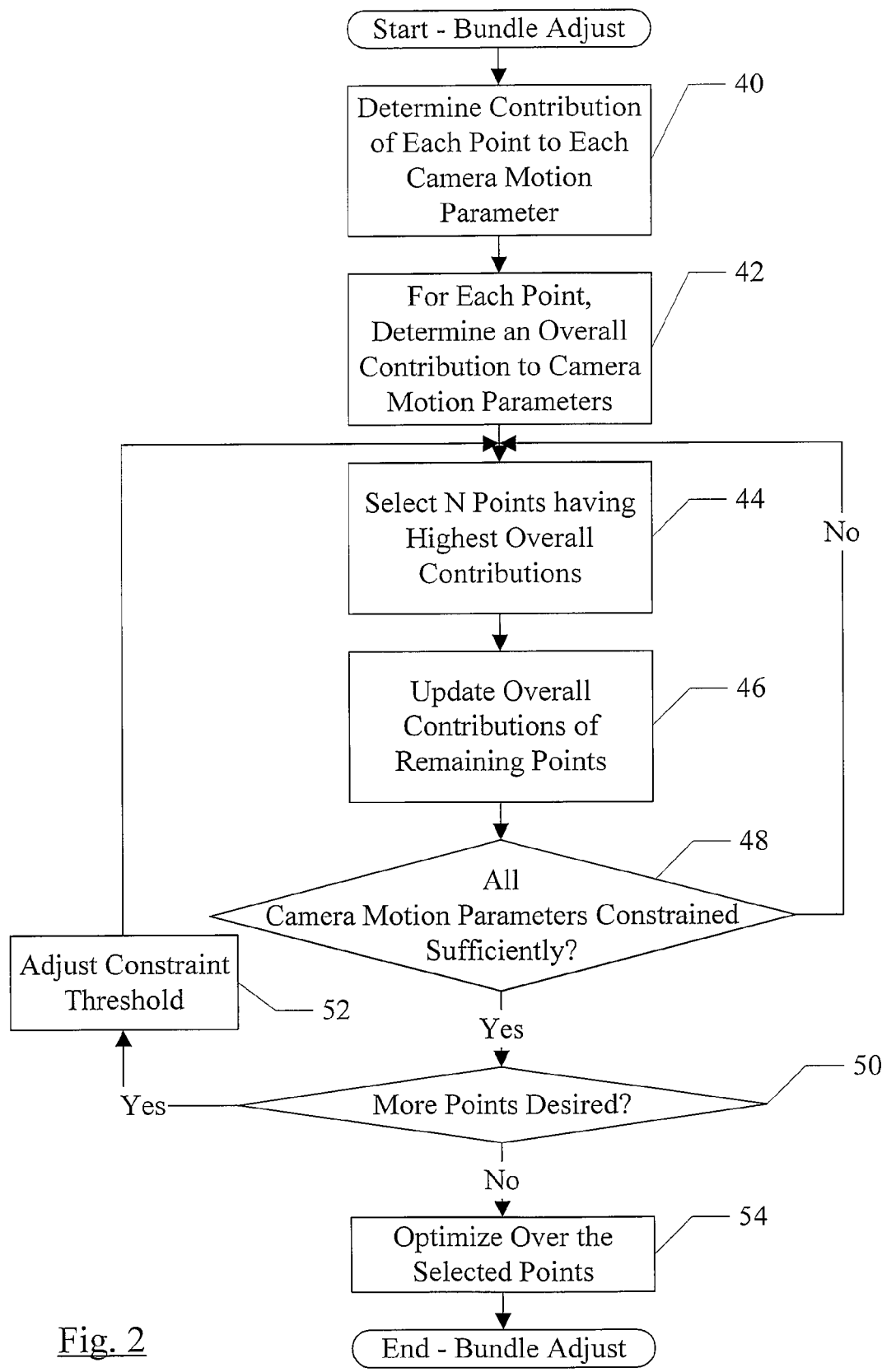
FIG. 2 is a flowchart illustrating operation of one embodiment of a bundle adjustment module.

Turning now to FIG. 2, a flowchart is shown illustrating at least a portion of the operation of the bundle adjustment module 28. While the blocks are shown in a particular order for ease of understanding, other orders may be used. In one embodiment, the bundle adjustment module 28 may comprise instructions which, when executed on a computer system or system, implement the operation of the flowchart shown in FIG. 2.

The bundle adjustment module 28 may determine the contribution of each 3D point to each camera motion parameter that is being optimized for (block 40). The contributions may be quantified in any fashion. The absolute numerical values may not necessarily have much meaning, in one embodiment, but may be relative indications of contribution (e.g. comparison of the contribution values to each other may have meaning). In one embodiment, the bundle adjustment module 28 may form the Jacobian matrix that relates the points to the camera parameters. The elements of the matrix that correspond to a given point may be its contributions to the various parameters (specifically, the absolute value of the elements). Generally, the Jacobian is based on the first derivative of the points with respect to each parameter. Various numerical methods for obtaining the Jacobian may be used.

The bundle adjustment module 28 may generate an overall contribution for each point, which is an indication of the total contribution of the point to the camera parameters (block 42). For example, the sum of the absolute values of the matrix entries corresponding to the point may be used. Alternatively, the sum may be weighted (e.g. if certain parameters known to be under constrained, the contributions corresponding to those parameters may be more heavily weighted to cause selection of points that constrain those parameters). Any mechanism for determining the total contribution of points may be used.

The bundle adjustment module 28 may select N points that have the highest overall contributions, as determined above with regard to block 42 (block 44). N may be a positive integer greater than zero, and may vary based on the values of the overall contributions in some embodiments. The bundle adjustment module 28 may analyze the individual contribution values for the selected points to each camera parameter, and may determine if at least some camera parameters are sufficiently constrained (at least for the current iteration of point selection). The sufficiently constrained measurement may be made in any fashion. For example, contributions from each selected point to a given parameter may be summed, and if the sum is greater than a specified constraint threshold, the parameter may be sufficiently constrained.

The bundle adjustment module 28 may update the overall contributions of the remaining (as yet unselected) points (block 46). For example, if a given parameter has been determined to be sufficiently constrained, the contributions of each point to that parameter may be zeroed and the overall contributions may be recomputed. In this fashion, points which contribute to an over constrained parameter may be less likely to be selected in subsequent iterations of point selection.

The bundle adjustment module 28 may determine if all parameters have been determined to be sufficiently constrained (decision block 48). As mentioned above, for a given iteration of the loop bounded by decision block 48, the measure for sufficiently constrained may be set at a constraint threshold. In one embodiment, the same constraint threshold may be used for each parameter. In other embodiments, different parameters may have different constraint thresholds, or different groups of parameters may have different constraint thresholds. If all parameters have not been sufficiently constrained (decision block 48, "no" leg), the bundle adjustment module 28 may select additional points based on the updated overall contributions (blocks 44 and 46).

If all parameters have been sufficiently constrained (decision block 48, "yes" leg), the bundle adjustment module 28 may determine if enough points have been selected to invoke the non-linear optimizer (decision block 50). The measurement of enough points may include one or more of: an absolute minimum expected to provide good results from the non-linear optimization, a minimum percentage of the total number of points, the greater of the two preceding minimums, minimum number of points from each image that has been processed in the structure from motion system, etc. If more points are desired (decision block 50, "yes" leg), the bundle adjustment module 28 may adjust the constraint threshold(s) so that additional points may be selected (block 52), and may return to select additional points (block 44). Alternatively, in some embodiments, the overall contribution values may be returned to the values calculated in block 42 to begin another iteration of point selection.

If no more points are desired (decision block 50, "no" leg), the bundle selection module 28 may invoke the non-linear optimization over the selected points (block 54).

Exemplary System

Figure 3:
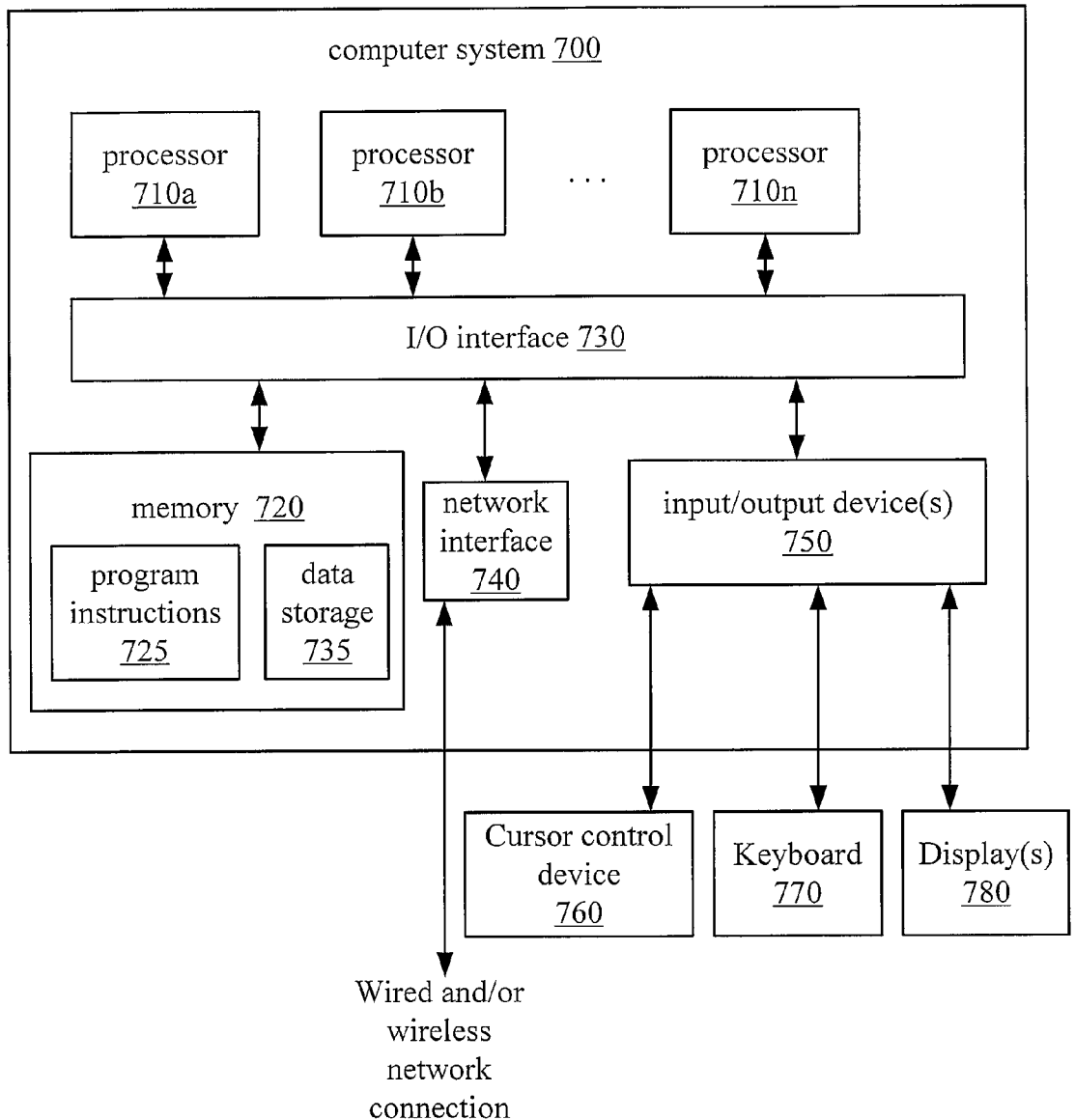
FIG. 3 illustrates an exemplary computer system that may be used in embodiments.

Various components of embodiments of a method and apparatus for region matching and other uses may be executed on one or more computer systems, which may interact with various other devices. One such computer system is illustrated by FIG. 3. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired operations, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 3, memory 720 may include program instructions 725, configured to implement embodiments of a method and apparatus described above, and data storage 735, comprising various data accessible by program instructions 725. In one embodiment, program instructions 725 may include software elements of a method and apparatus described above. Data storage 735 may include data that may be used in embodiments. In other embodiments, other or different software elements and data may be included.

In some embodiments, the computer system 700 may also include a graphics processing unit (GPU). The GPU may be optimized for graphics processing (e.g. for generating images to be displayed on a display screen connected to the computer system 700). The GPU may be programmable with program instructions according to the instruction set implemented by the GPU (e.g. instruction sets developed by graphics manufacturers such as NVIDIA or ATI). In some embodiments, the GPU may have a private, dedicated memory accessible only to the GPU. The program instructions may be stored in the private memory, in one embodiment. In one embodiment, the GPU may execute program instructions to implement some or all of the method describe herein.

Those skilled in the art will appreciate that computer system 700 is merely illustrative and is not intended to limit the scope of a method and apparatus as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

The various methods as illustrated in the drawings and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
   receiving a set of three dimensional (3D) points estimated from a plurality of images;
   determining a contribution of each of the 3D points in the set to constraining each of a plurality of camera parameters;
   selecting a subset of the 3D points that, as a group, provide at least a desired amount of constraint on each of the plurality of camera parameters, the subset excluding one or more of the 3D points in the set;
   determining that each of the plurality of camera parameters are sufficiently constrained according to a threshold and that not enough of the 3D points have been selected to perform a non-linear optimization;
   updating the threshold to repeat said selecting the subset of the 3D points to sufficiently constrain each of the plurality of camera parameters to the updated threshold; and performing the non-linear optimization over the selected subset of the 3D points to recover the plurality of camera parameters and the 3D points.

2. The method as recited in claim 1 wherein selecting the subset of the 3D points comprises:
   selecting the 3D points for the subset based on overall contributions of each 3D point to each of the plurality of camera parameters;
   updating the overall contributions of the non-selected 3D points; and
   selecting one or more additional 3D points for the subset based on the updated overall contributions.

3. The method as recited in claim 2 wherein determining the contribution comprises forming a Jacobian matrix that relates the set of 3D points to the plurality of camera parameters.

4. The method as recited in claim 3 wherein the contribution of a given 3D point in the set to a given camera parameter of the plurality of camera parameters is derived from an entry in the Jacobian matrix that relates the given 3D point and the given camera parameter.

5. The method as recited in claim 4 wherein the contribution of the given 3D point is indicated as the absolute value of the entry in the Jacobian matrix.

6. The method as recited in claim 2 wherein determining the contribution of each of the 3D points in the set comprises determining the contribution of a given 3D point in the set to each of the plurality of camera parameters and summing the contributions to generate the overall contribution of the given 3D point.

7. The method as recited in claim 6 wherein updating the overall contributions comprises eliminating contributions from the sum that correspond to one or more of the camera parameters that are sufficiently constrained according to the selected 3D points in the subset.

8. A computer-readable storage media device comprising stored instructions that are executable and, responsive to execution of the instructions by a computing device, the computing device performs operations comprising to:
   receive a set of three dimensional (3D) points estimated from a plurality of images;
   determine a contribution of each of the 3D points in the set to constraining each of a plurality of camera parameters;
   select a subset of the 3D points that, as a group, provide at least a desired amount of constraint on each of the plurality of camera parameters, the subset excluding one or more of the 3D points in the set;
   determine that each of the plurality of camera parameters are sufficiently constrained according to a threshold and that not enough of the 3D points have been selected to perform a non-linear optimization;
   update the threshold to repeat selection of the subset of the 3D points to sufficiently constrain each of the plurality of camera parameters to the updated threshold; and perform the non-linear optimization over the selected subset of the 3D points to recover the plurality of camera parameters and the 3D points.

9. The computer-readable storage media device as recited in claim 8 wherein the computing device performs the operation to select the subset of the 3D points further configured to:
   select the 3D points for the subset based on overall contributions of each 3D point to each of the plurality of camera parameters;
   update the overall contributions of the non-selected 3D points; and select one or more additional 3D points for the subset based on the updated overall contributions.

10. The computer-readable storage media device as recited in claim 9 wherein the computing device performs the operation to determine the contribution further configured to form a Jacobian matrix that relates the set of 3D points to the plurality of camera parameters.

11. The computer-readable storage media device as recited in claim 10 wherein the contribution of a given 3D point in the set to a given camera parameter of the plurality of camera parameters is derived from an entry in the Jacobian matrix that relates the given 3D point and the given camera parameter.

12. The computer-readable storage media device as recited in claim 11 wherein the contribution of the given 3D point is indicated as the absolute value of the entry in the Jacobian matrix.

13. The computer-readable storage media device as recited in claim 9 wherein the computing device performs the operation to contribution of each of the 3D points in the set further configured to determine the contribution of a given 3D point in the set to each of the plurality of camera parameters and sum the contributions to generate the overall contribution of the given 3D point.

14. The computer-readable storage media device as recited in claim 13 wherein the computing device performs the operation to update the overall contributions further configured to eliminate contributions from the sum that correspond to one or more of the camera parameters that are sufficiently constrained according to the selected 3D points in the subset.

15. A computer system comprising:
   a memory configured to store a source video sequence comprising a plurality of images;
   a processor to implement a bundle adjustment module that is configured to:
   receive a set of three dimensional (3D) points estimated from the plurality of images by one or more other modules based on feature correspondences between two or more images of the plurality of images;
   determine a contribution of each of the 3D points in the set to constraining each of a plurality of camera parameters;
   select a subset of the 3D points that, as a group, provide at least a desired amount of constraint on each of the plurality of camera parameters, the subset excluding one or more of the 3D points in the set;
   determine that each of the plurality of camera parameters are sufficiently constrained according to a threshold and that not enough of the 3D points have been selected to perform a non-linear optimization;
   update the threshold to repeat selection of the subset of the 3D points to sufficiently constrain each of the plurality of camera parameters to the updated threshold; and
   perform the non-linear optimization over the selected subset of the 3D points to recover the plurality of camera parameters and the 3D points.

16. The computer system as recited in claim 15 wherein the bundle adjustment module is configured to:
   select the 3D points for the subset based on overall contributions of each 3D point to each of the plurality of camera parameters;
   update the overall contributions of the non-selected 3D points; and
   select one or more additional 3D points for the subset based on the updated overall contributions.

17. The computer system as recited in claim 16 wherein to determine the contribution of each of the 3D points in the set, the bundle adjustment module is configured to determine the contribution of a given 3D point in the set to each of the plurality of camera parameters and sum the contributions to generate the overall contribution of the given 3D point.

18. The computer system as recited in claim 17 wherein to update the overall contributions, the bundle adjustment module is configured to eliminate contributions from the sum that correspond to one or more of the camera parameters that are sufficiently constrained according to the selected 3D points in the subset.

19. A computer-implemented method comprising:
- executing instructions on a specific apparatus so that binary digital electronic signals representing a subset of a set of three dimensional (3D) points estimated from a plurality of images are selected;
- determining a contribution of each of the 3D points to constraining each of a plurality of camera parameters, the subset, as a group, providing at least a desired amount of constraint on each of the plurality of camera parameters;
- determining that each of the plurality of camera parameters are sufficiently constrained according to a threshold and that not enough of the 3D points have been selected to perform a non-linear optimization;
- updating the threshold to repeat selection of the subset of the 3D points to sufficiently constrain each of the plurality of camera parameters to the updated threshold;
- executing instructions on a specific apparatus so that binary digital electronic signals representing the selected subset have the non-linear optimization performed over the selected subset of the 3D points to recover the plurality of camera parameters and the 3D points; and
- storing the plurality of camera parameters and the 3D points in a memory location of the specific apparatus.

20. The computer-implemented method as recited in claim 19, further comprising:
- selecting the 3D points for the subset based on overall contributions of each 3D point to each of the plurality of camera parameters;
- updating the overall contributions of the non-selected 3D points; and
- selecting one or more additional 3D points for the subset based on the updated overall contributions.

21. The computer-implemented method as recited in claim 20, wherein said determining the contribution of each of the 3D points comprises determining the contribution of a given 3D point to each of the plurality of camera parameters and summing the contributions to generate the overall contribution of the given 3D point.

22. The computer-implemented method as recited in claim 21, wherein said updating the overall contributions comprises eliminating contributions from the sum that correspond to one or more of the camera parameters that are sufficiently constrained according to the selected 3D points in the subset.

* * * * *